United States Patent
Kossel et al.

(10) Patent No.: US 8,164,373 B2
(45) Date of Patent: Apr. 24, 2012

(54) DRIVE STRENGTH CONTROL OF PHASE ROTATORS

(75) Inventors: Marcel A. Kossel, Reichenburg (CH);
Daihyun Lim, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 12/845,966

(22) Filed: Jul. 29, 2010

(65) Prior Publication Data

US 2012/0025888 A1    Feb. 2, 2012

(51) Int. Cl.
*H03H 11/16*    (2006.01)
(52) U.S. Cl. .......................... 327/231; 327/234; 327/235
(58) Field of Classification Search .................. 327/231, 327/233–235
See application file for complete search history.

(56) References Cited

U.S. PATENT DOCUMENTS

| | | | |
|---|---|---|---|
| 6,172,525 B1 * | 1/2001 | Wennekamp | 326/83 |
| 7,656,986 B2 | 2/2010 | Chen | |
| 7,994,837 B1 * | 8/2011 | Ho et al. | 327/231 |
| 2010/0329403 A1 * | 12/2010 | Beukema et al. | 375/356 |

OTHER PUBLICATIONS

IBM Cu45HP DDR3 2.133G (NEO) Circuit Workbook 1.18, Feb. 7, 2010; Copyright International Business Machines Corporation 2009; Printed in the United States of America Mar. 2009.

* cited by examiner

*Primary Examiner* — An Luu
(74) *Attorney, Agent, or Firm* — Cantor Colburn LLP; Daniel Morris

(57) ABSTRACT

A phase rotator includes a phase selector stage operative to receive a clock signal and output a first phase and a second phase of the clock signal, a slew rate control stage including a first pass gate circuit operative to control a slew rate of the first phase of the clock signal and a second pass gate circuit operative to control a slew rate of the second phase of the clock signal, and a phase blending stage operative to combine the first phase with the second phase of the clock signal and output a phase rotated signal.

20 Claims, 4 Drawing Sheets

DRIVE STRENGTH CONTROL OF PHASE ROTATORS

BACKGROUND

The present invention relates to complimentary metal oxide semiconductor (CMOS) phase rotators.

CMOS phase rotators are used in serial link receivers to adjust the phase of a sampling clock. Typical phase rotators include three stages: (a) a phase selector stage that receives a clock signal consisting of multiple phases from a clock generator and selects from that multiphase clock signal two phases that are interpolated; (b) a strength control (slew rate control) stage that adjusts the slew rate of the two phase signals selected to improve the linearity in the successive phase interpolation; and (c) a weight control (phase blending) stage that performs phase blending and outputs a phase-rotated signal.

Previous CMOS phase rotators include a strength control stage having a plurality of field effect transistors (FETs) arranged as current-starved inverters. The number of FETs used in the arrangement is determined by the strength of the slew rate. The slew rate represents the rate of change of the selected phase signals, and is a measure for the steepness of the signal edges. Slew rate is measured in volts per second (V/s). If the signal edges are too steep (which corresponds to too high a value of the slew rate), the phase interpolation in the successive phase blending stage becomes undesirably non-linear and may lead to unequal or even non-monotonic phase steps. The drive strength control stage reduces the slew rate of the selected phase signals. There is an optimum value in the slew rate reduction since too low a value of the slew rate increases timing jitter and may prevent the signal from remaining full swing. At lower frequencies, the typical slew rate strength is greater than at higher frequencies because of the smaller impact of parasitic capacitances at lower frequencies that do not sufficiently load the signals. As a consequence, the current starving in the current starved inverters is increased, which results in a greater number of stacked FETs. However, if the frequency is very high, the impact of the capacitive parasitics becomes stronger, and the signals may not reach full-swing. In such a case, additional current-starved inverters are switched in parallel to increase the drive strength, which also increases the slew rate to the optimum value. A greater number of FETs are required in the arrangement if the bandwidth of the CMOS phase rotator is increased either towards higher or lower frequencies. These FETs in the additional current starved inverter stages, and the control lines used to operate the FETs occupy valuable space in a CMOS device and consume power.

As CMOS devices become smaller, it is desirable to reduce the amount of space to increase the integration density and the power used by FETs in the devices to become more energy-efficient.

BRIEF SUMMARY

According to one embodiment of the present invention, a phase rotator includes a phase selector stage operative to receive a clock signal and output a first phase and a second phase of the clock signal, a slew rate control stage including a first pass gate circuit operative to control a slew rate of the first phase of the clock signal and a second pass gate circuit operative to control a slew rate of the second phase of the clock signal, and a phase blending stage operative to combine the first phase with the second phase of the clock signal and output a phase rotated signal.

According to another embodiment of the present invention, a system includes a sampling latch device, a phase rotator including a phase selector stage operative to receive a clock signal and output a first phase and a second phase of the clock signal, a slew rate control stage including a first pass gate circuit operative to control a slew rate of the first phase of the clock signal and a second pass gate circuit operative to control a slew rate of the second phase of the clock signal, and a phase blending stage operative to combine the first phase with the second phase of the clock signal and output a phase rotated signal to the sampling latch device, a processor connected to the phase rotator, and a digital to analog converter (DAC) device connected to the phase rotator.

According to yet another embodiment of the present invention, a phase rotator includes a phase selector stage operative to receive a clock signal and output a first phase and a second phase of the clock signal, a slew rate control stage including a first pass gate circuit including a plurality of binary weighted pass gates operative to control a slew rate of the first phase of the clock signal and a second pass gate circuit including a plurality of binary weighted pass gates operative to control a slew rate of the second phase of the clock signal, and a phase blending stage operative to combine the first phase with the second phase of the clock signal and output a phase rotated signal.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
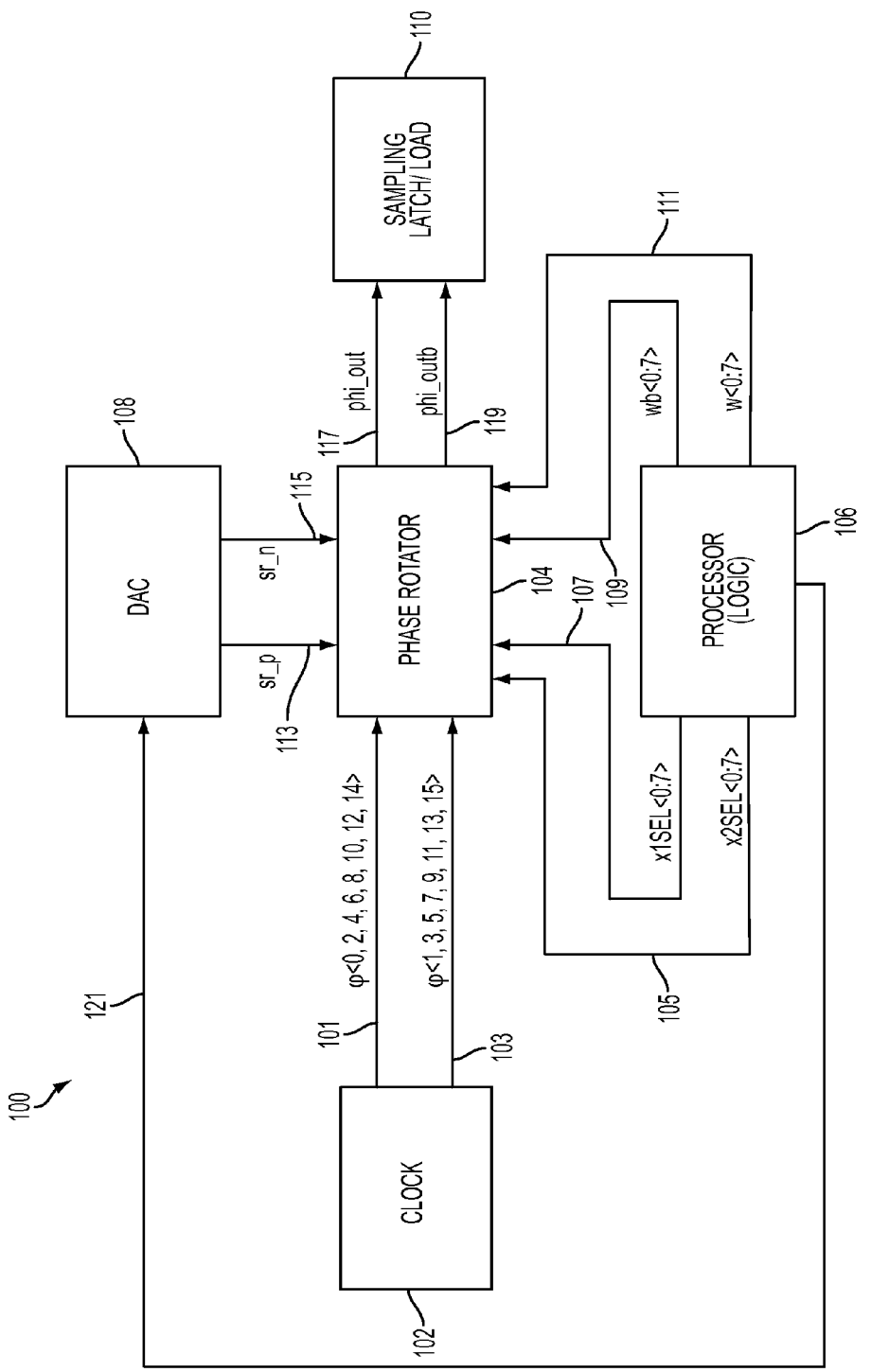
FIG. 1 illustrates a block diagram of an exemplary embodiment of a portion of a serial link receiver system.

FIG. 1 illustrates a block diagram of an exemplary embodiment of a portion of a serial link receiver system 100. In this regard, the system 100 includes a multiphase clock generator (clock) 102. Typical implementations of multiphase clock generators include multiphase voltage-controlled oscillators (VCOs) in phase-look-loop (PLL) circuits or multiphase output signals from delay lines in delay-locked-loop (DLL) circuits. The clock generator 102 outputs a clock signal having a plurality of phases ($\phi$). In the illustrated embodiment, the clock generator 102 outputs 16 phases with phases <0, 2, 4, 6, 8, 10, 12, 14> indicated by the set of signal lines 101 and phases <1, 3, 5, 7, 9, 11, 13, 15> indicated by the set of signal lines 103. The following nomenclature is used: The parentheses < > denote a vector of phases with a length of 8 in this example. The individual vector elements refer to the different phases according to f×360°/16 for φ<f>, e.g. φ<5>=5×360°/16=112.5°. The phases on the signal lines 101 and 103 are arranged such that adjacent phases are on top of each other; e.g. φ<5> is located on 101 whereas the next phase signal φ<1> is on 103 and analogously for the other phase signals. This arrangement is used by the subsequent phase rotator 104 that interpolates adjacent phase pairs. A phase rotator 104 receives the signals from the clock generator 102 and outputs a phase-rotated differential output signal (phi_out and phi_outb) on the signal lines 117 and 119, respectively, to a sampling latch (load) 110 that may include, for example, a load for the phase rotator 104 such as, for example, a delay-locked-loop (DLL) circuit or other type of load. Phase rotated signals may also be used as input signals to other circuits such as for instance DLLs if multiple sampling clocks are to be generated from the phase rotated signal such as, for example, in oversampling receivers. The phase rotator 104 receives phase selection signals (x1SEL<0:7> and x2SEL<0:7>) at input 107 and 105 respectively and interpolation weighting signals (w<0:7> and wb<0:7>) at input 111 and 109 respectively from a processor 106. The phase rotator 104 may receive slew rate control signals (sr_p and sr_n) output from a digital to analog converter (DAC) 108 at inputs 113 and 115. The DAC 108 may receive a signal 121 from the processor 106 to generate the appropriate control signal sr_p and sr_n, respectively.

Figure 2:
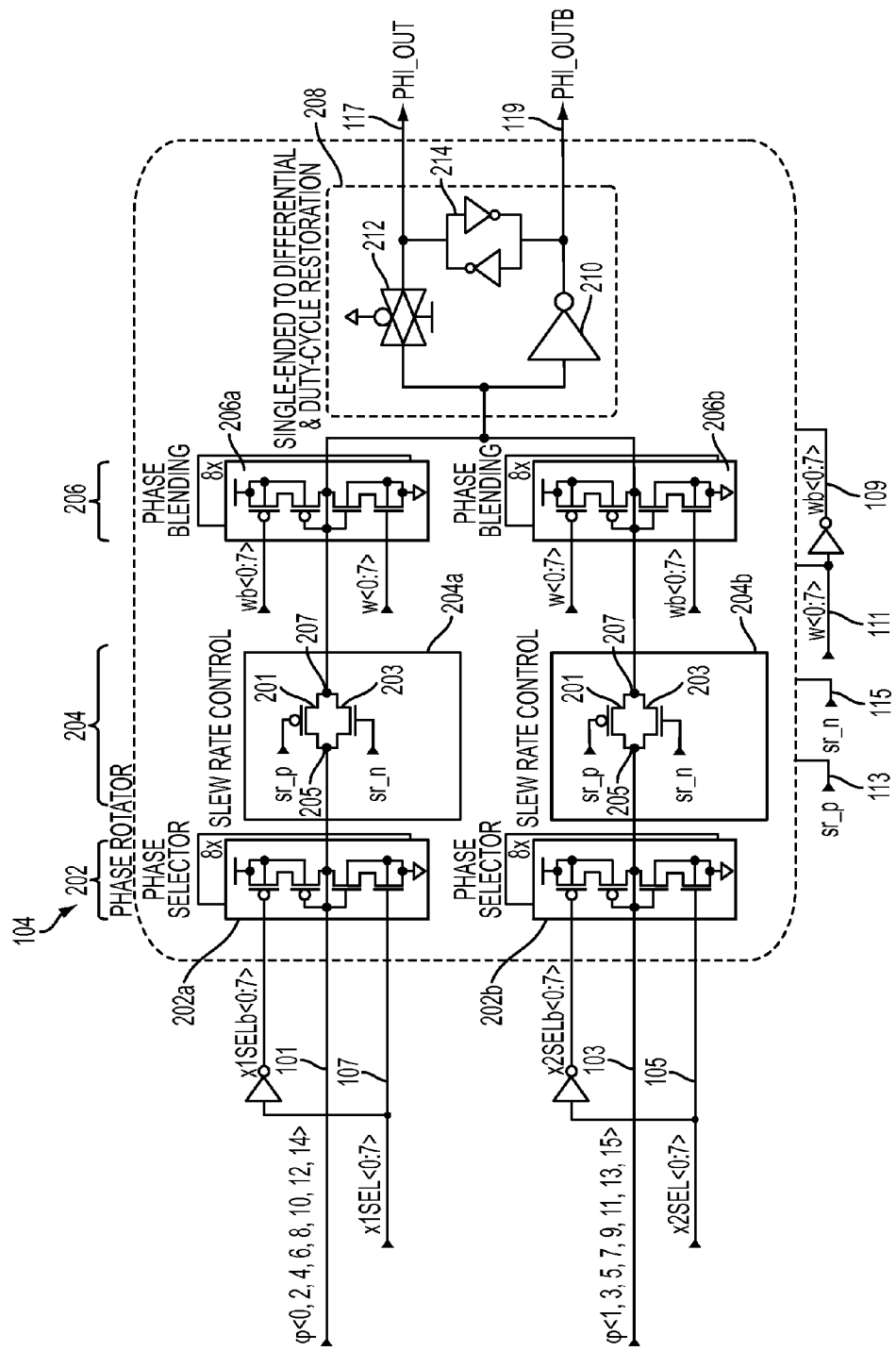
FIG. 2 illustrates a block diagram of an exemplary embodiment of the phase rotator of the system of FIG. 1.

FIG. 2 illustrates a block diagram of an exemplary embodiment of the phase rotator 104. The phase rotator 104 includes a phase selector stage 202 including sub-stages 202a and 202b; a slew rate control stage 204 including sub-stages 204a and 204b; a phase blending stage 206 including sub-stages 206a and 206b; and a differential-to-single-ended converter with duty-cycle restoration portion 208.

In operation, the phase rotator 104 receives the clock signal from the clock generator 102 (of FIG. 1). The phase selector stage selects two of the phases from the multiphase clock signal. In this regard, each phase selector sub-stage 202a and 202b includes an arrangement of FETs that receive the clock signal and select a phase determined by the received phase selection signals (x1SEL<0:7> and x2SEL<0:7>). For example, the phase selector sub-stage 202a may select and output the phase 0 (i.e., φ<0>)=0° while the phase selector sub-stage 202b may select and output the phase 1 (i.e., φ<1>)=22.5°.

The slew rate control stage 204 receives the selected phases of the clock signal from the phase selector-sub stages 202a and 202b at nodes 205 of the respective slew rate control sub-stages 204a and 204b. The slew rate control sub-stages 204a and 204b each include a pass gate arrangement of FETs. The arrangement of FETs includes a pFET 201 and an nFET 203 in each sub-stage 204a and 204b arranged such that the source terminals of the pFETs 201 and the nFETs 203 share the node 205 and the drain terminals of the pFET 201 and the nFET 203 share a node 207. The gate terminals of the pFETs 201 receive an analog signal sr_p from the DAC 108 (of FIG. 1) and the gate terminals of the nFETs 203 receive an analog signal sr_n from the DAC 108. The slew rate control stage 204 acts as a variable series resistor and outputs signals from the sub-stages 204a and 204b to the respective sub-stages 206a and 206b of the phase blending stage 206. The Thevenin equivalent resistance (R) of the slew rate control stage 204 may be tuned by the voltage output from the DAC 108 to the gate terminals of the pFETs 201 and the nFETs 203.

The phase blending stage 206 includes the phase blending sub-stages 206a and 206b that receive the output signals from the respective slew rate control sub-stages 204a and 204b. The phase blending sub-stages 206a and 206b include an arrangement of FETs that receive interpolation weighting signals (w<0:7> and wb<0:7>). The phase blending stage 206 blends the phases of the signals by interpolation. The weighting of the interpolation is defined by the interpolation weighting signals (w<0:7> and wb<0:7>). The temperature-coded weight codes (w<0:7> and wb<0:7>) determine how many inverter stages in 206a and 206b are enabled. For instance, for w<0:7>=1,1,1,0,0,0,0,0, there are three inverter stages (according to the number of 1s) enabled in 206a whereas in 206b there are 5 inverter stages enabled (the w- and wb-vectors are swapped between 206a and 206b). Because of the different number of driving inverters in 206a and 206b, the common output node of 206a and 206b receives the superposition of a strong signal from the 206b output (because there are five inverters enabled) and a weaker signal from the 206a output (because there are only three inverters enabled) The final output signal is therefore a signal with a phase in between the selected signals φ<0> and φ<1> with an phase shift towards φ<1> according to the 3 and 5 inverters selected in the phase blending stage. The input load capacitance (C) of the phase blending stage 206 effects the edge steepness of the selected phase signals at the nodes 207 and hence the value of C is decisive for the linearity of the phase steps.

The amount of slewing (drive strength control) performed by the slew rate control stage 204 may be defined by the time constant (τ) where τ=RC. Thus, the input load capacitance C of the phase blending stage 206 and the resistance R of the slew rate control stage 204 determine the time constant τ.

The phase blending sub-stages 206a and 206b output a phase blended signal to the single-ended-to-differential converter with duty-cycle restoration portion 208 that outputs the signals phi_out and phi_outb to the sampling latch 110 (of FIG. 1). The single-ended-to-differential converter, which is represented in FIG. 2 includes an inverter 210 operated in parallel to a pass-gate circuit 212, that accommodates sampling latches that may have differential clock inputs. Differential or balanced signaling is applied in high speed signal processing to mitigate noise-induced non-idealities (e.g. amplitude or timing jitter) on signal lines such as for instance the wires of a sampling clock. Non-idealities would manifest in common-mode fluctuations and hence cancel if the circuit is operated differentially. Cross-coupled inverters 214 connecting the output lines 117 and 119 perform duty-cycle restoration. Reducing the edge steepness to gain in phase blending linearity makes the phase selector signals more prone to duty cycle distortion. If the phase rotator is operated only with a single-ended output, the duty cycle restoration with cross-coupled inverters cannot be applied. In that case, duty cycle restoration could be performed via the sr_p and sr_n control signals, for instance by slewing the rising edge more than the falling edge or vice versa. Differential output signaling may be used when the phase rotator output signal is used as input signal for a DLL circuit (instead of a single sampling latch), which produces multiple output signals for an oversampling receiver.

Figure 3:
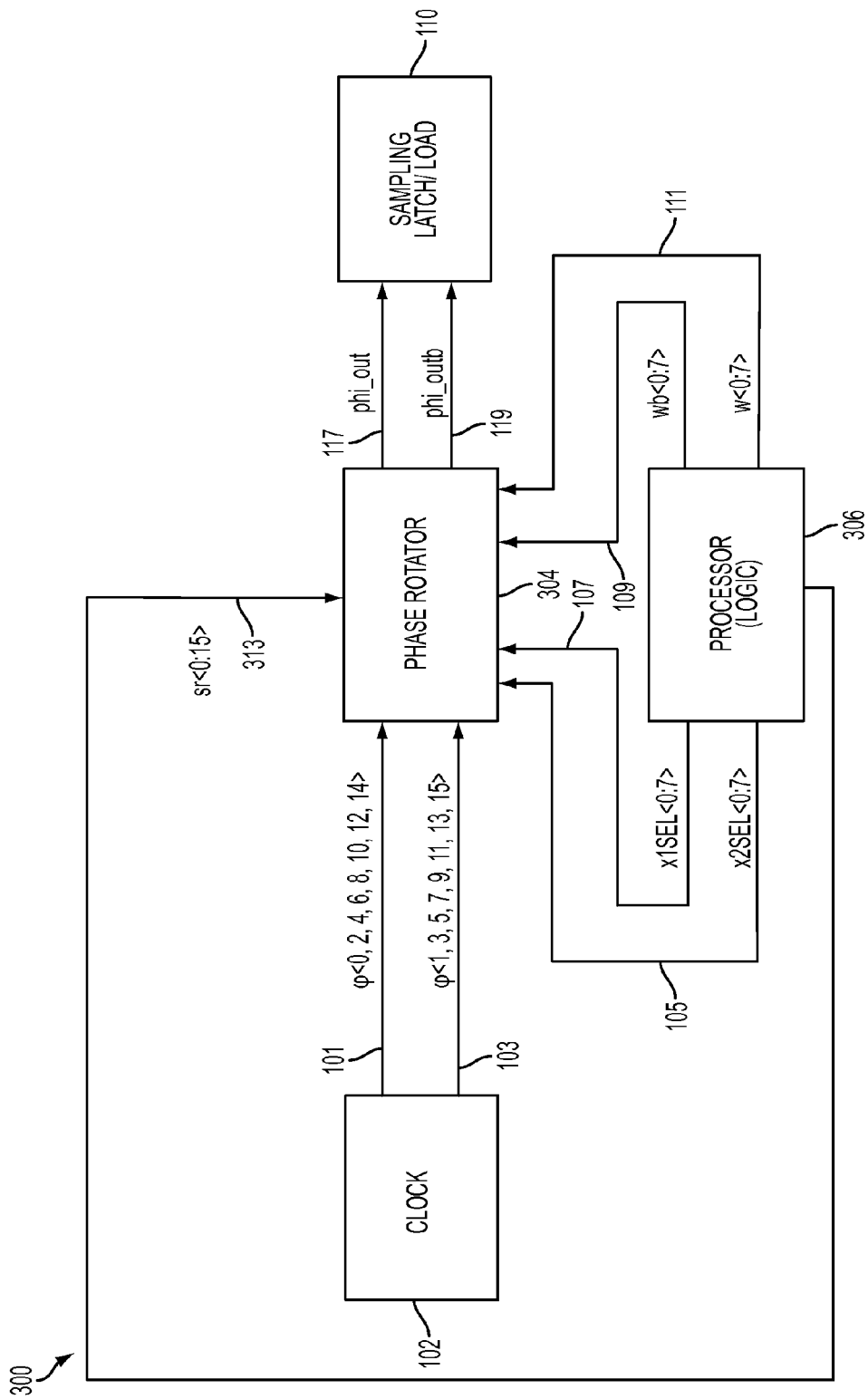
FIG. 3 illustrates a block diagram of an alternate exemplary embodiment of a portion of a serial link receiver system.

FIG. 3 illustrates a block diagram of an alternate exemplary embodiment of a portion of a serial link receiver system 300. The system 300 is similar in operation to the system 100 (of FIG. 1) described above, however, the system 300 may not include the DAC 108 and includes an alternate embodiment of a phase rotator 304 and the processor 306.

Figure 4:
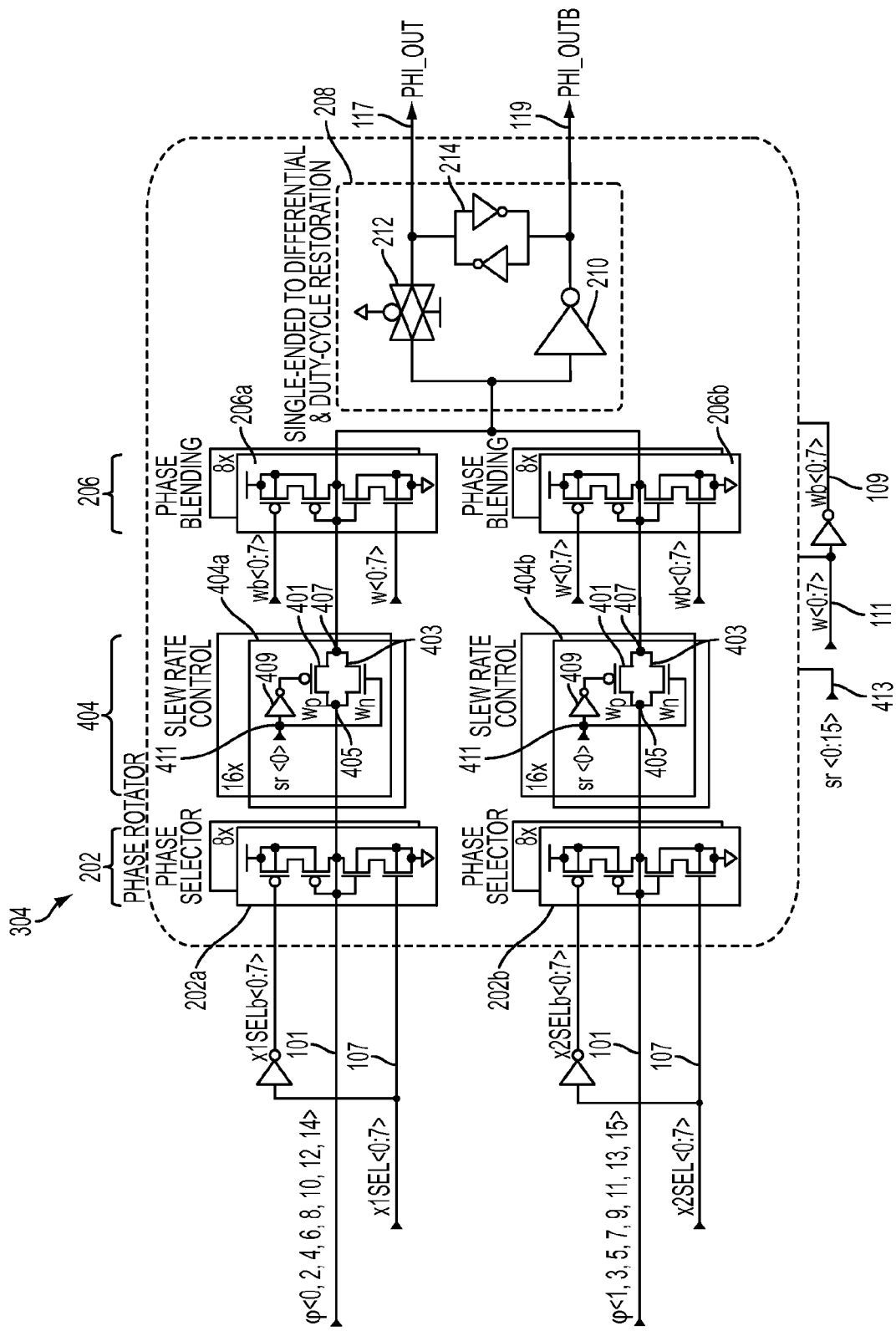
FIG. 4 illustrates a block diagram of an alternate exemplary embodiment of the phase rotator of the system of FIG. 3.

FIG. 4 illustrates a block diagram of an alternate embodiment of a phase rotator 304. The phase rotator 304 is similar to the phase rotator 104 (of FIG. 2) described above, however the phase rotator 304 includes an alternate embodiment of a slew rate stage 404 having slew rate sub-stages 404a and 404b. Each slew rate sub-stage 404a and 404b includes an arrangement of FETs that form binary or temperature weighted pass-gate banks that may be arranged in parallel. In this regard, the arrangement of FETs includes at least a bank including a pFET 401 having a weight (Wp) defined by the width of the gate and an nFET 403 having a weight (Wn) defined by the width of the gate. The source terminals of the pFET 401 and the nFET 403 are connected to a node 405 that receives the phase selected clock signals from the respective phase selector sub-stages 202*a* and 202*b*. The drain terminals of the pFET 401 and the nFET 403 are connected to a node 407 that is connected to the inputs of the phase blending sub-stages 206*a* and 206*b*. A digital signal sr<0:15> is received at an input 413 from the processor 306 (of FIG. 3) connected to a node 405. The signal sr<0:15> is a digital control vector sent to the gate terminal of the nFET 403 and the gate terminal of the pFET 401 (via an inverter 409 connected to the node 405).

In operation, the phase selector stage 202 and the phase blending stage 206 of the phase rotator 300 operate in a similar manner to the phase selector stage 202 and the phase blending stage 206 as described in FIG. 2 above. The resistance R of the slew rate control stage 404 is controlled by the digital signal sr<0:15>. The parallel-connected pass-gate banks are selected by the digital control vector sr<0:15>. The weights of the phase selector stage 202 are implemented by selecting different widths of the pFETs 401 and nFETs 403 in the pass-gates.

The technical effects and benefits of the methods and systems described above provide a phase rotator having a slew rate control stage that may include a pass-gate arrangement of field effect transistors. The pass-gate arrangement receives a control signal from a digital to analog converter. The embodiments of the slew rate control stage provide a stage that occupies a relatively small amount of chip space; and improved performance by increasing the linearity of the output signals over a wider tuning range while reducing power consumption. The improved performances manifests (a) in a wider tuning range because the pass-gates can have a higher tuning range (in terms of series resistance R in the time constant τ) than digitally controlled current-starved inverters, (b) in a better linearity of the output signal and (c) in less susceptibility to power supply noise because the pass-gates are not directly connected to the supply rails.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A phase rotator including:
   a phase selector stage operative to receive a clock signal and output a first phase and a second phase of the clock signal;
   a slew rate control stage including a first pass gate circuit operative to control a slew rate of the first phase of the clock signal and a second pass gate circuit operative to control a slew rate of the second phase of the clock signal; and
   a phase blending stage operative to combine the first phase with the second phase of the clock signal and output a phase rotated signal.

2. The phase rotator of claim 1, wherein the phase rotated signal is output to a sampling latch device.

3. The phase rotator of claim 1, wherein the slew rate control stage is operative to receive an analog control signal.

4. The phase rotator of claim 1, wherein the slew rate control stage is connected to a digital to analog converter device and is operative to receive an analog control signal from the digital to analog converter device.

5. The phase rotator of claim 1, wherein the first pass gate circuit includes a first p-type field effect transistor (pFET) connected in parallel with a first n-type field effect transistor (nFET).

6. The phase rotator of claim 5, wherein a gate terminal of the first pFET and a gate terminal of the first nFET are connected to a digital to analog converter device and are operative to receive an analog control signal from the digital to analog converter device.

7. The phase rotator of claim 6, wherein the analog control signal is operative to control an amount of the slew rate of the first pass gate circuit.

8. A system including:
   a load device;
   a phase rotator including:
      a phase selector stage operative to receive a clock signal and output a first phase and a second phase of the clock signal;
      a slew rate control stage including a first pass gate circuit operative to control a slew rate of the first phase of the clock signal and a second pass gate circuit operative to control a slew rate of the second phase of the clock signal; and
      a phase blending stage operative to combine the first phase with the second phase of the clock signal and output a phase rotated signal to the load device;
   a processor connected to the phase rotator; and
   a digital to analog converter (DAC) device connected to the phase rotator.

9. The system of claim 8, wherein the phase rotated signal is output to the load device.

10. The system of claim 9, wherein the load device includes a sampling latch device.

11. The system of claim 9, wherein the load device includes a delay-locked-loop (DLL) circuit.

12. The system of claim 9, wherein the slew rate control stage is operative to receive an analog control signal.

13. The system of claim 9, wherein the slew rate control stage is connected to the DAC device and is operative to receive an analog control signal from the DAC device.

14. The system of claim 9, wherein the first pass gate circuit includes a first p-type field effect transistor (pFET) connected in parallel with a first n-type field effect transistor (nFET).

15. The system of claim 14, wherein a gate terminal of the first pFET and a gate terminal of the first nFET are connected to the DAC device and are operative to receive an analog control signal from the DAC device.

16. The system of claim 14, wherein the analog control signal is operative to control an amount of the slew rate of the first pass gate circuit.

17. A phase rotator including:
a phase selector stage operative to receive a clock signal and output a first phase and a second phase of the clock signal;
a slew rate control stage including a first pass gate circuit including a plurality of binary weighted pass gates operative to control a slew rate of the first phase of the clock signal and a second pass gate circuit including a plurality of binary weighted pass gates operative to control a slew rate of the second phase of the clock signal; and
a phase blending stage operative to combine the first phase with the second phase of the clock signal and output a phase rotated signal.

18. The phase rotator of claim 17, wherein the phase rotated signal is output to a sampling latch device.

19. The phase rotator of claim 17, wherein the slew rate control stage is operative to receive a digital control signal.

20. The phase rotator of claim 17, wherein the digital control signal is operative to control an amount of the slew rate of the first pass gate circuit and the second pass gate circuit.

* * * * *